United States Patent
Stewart et al.

(10) Patent No.: US 10,657,199 B2
(45) Date of Patent: May 19, 2020

(54) CALIBRATION TECHNIQUE FOR RULES USED WITH ASSET MONITORING IN INDUSTRIAL PROCESS CONTROL AND AUTOMATION SYSTEMS

(71) Applicant: Honeywell International Inc., Morris Plains, NJ (US)

(72) Inventors: Gregory E. Stewart, North Vancouver (CA); David J. Germann, North Vancouver (CA); Marc Light, Saint Paul, MN (US); Sharath Venkatesha, Minnetonka, MN (US)

(73) Assignee: Honeywell International Inc., Morris Plains, NJ (US)

( * ) Notice: Subject to any disclaimer, the term of this patent is extended or adjusted under 35 U.S.C. 154(b) by 479 days.

(21) Appl. No.: 15/053,942

(22) Filed: Feb. 25, 2016

(65) Prior Publication Data

US 2017/0249285 A1    Aug. 31, 2017

(51) Int. Cl.
*G06F 17/18* (2006.01)
*G05B 23/02* (2006.01)
*G06Q 10/06* (2012.01)
*G06Q 40/00* (2012.01)
*G06Q 50/04* (2012.01)

(52) U.S. Cl.
CPC ......... *G06F 17/18* (2013.01); *G05B 23/0232* (2013.01); *G05B 23/0297* (2013.01); *G06Q 10/0639* (2013.01); *G06Q 40/12* (2013.12); *G06Q 50/04* (2013.01)

(58) Field of Classification Search
CPC .............................. G06F 17/18; G06Q 40/12

USPC ..................................................... 702/179
See application file for complete search history.

(56) References Cited

U.S. PATENT DOCUMENTS

| | | |
|---|---|---|
| 5,657,390 A | 8/1997 | Elgamal et al. |
| 6,480,896 B1 | 11/2002 | Brown et al. |
| 6,718,513 B1 * | 4/2004 | Ryu ............ H04L 41/06 370/242 |
| 6,816,973 B1 | 11/2004 | Gleichauf et al. |
| 7,130,891 B2 | 10/2006 | Bernardin et al. |
| 7,233,830 B1 | 6/2007 | Callaghan et al. |
| 7,266,417 B2 | 9/2007 | Liao |
| 7,286,897 B2 | 10/2007 | Liu et al. |

(Continued)

FOREIGN PATENT DOCUMENTS

WO    WO 2005/020179 A1    3/2005

OTHER PUBLICATIONS

Aaron Skonnard, "Why Service Virtualization Matters", Microsoft Services, 4 pages, Mar. 2009.

(Continued)

*Primary Examiner* — Marc Anthony Armand (57) ABSTRACT

A method includes identifying a statistical performance of a monitoring rule associated with an asset monitoring system. The monitoring rule includes logic configured to identify one or more faults with at least one asset, and the statistical performance includes an effectiveness of the monitoring rule in identifying the one or more faults. The method also includes identifying an economic performance of the monitoring rule, where the economic performance is based on costs associated with different outcomes of the monitoring rule. The method further includes updating or replacing the monitoring rule based on the economic performance.

18 Claims, 5 Drawing Sheets

(56) References Cited

U.S. PATENT DOCUMENTS

| | | |
|---|---|---|
| 7,313,447 B2 | 12/2007 | Hsiung et al. |
| 7,343,152 B1 | 3/2008 | Khorram |
| 7,461,403 B1 | 12/2008 | Libenzi et al. |
| 7,548,977 B2 | 6/2009 | Agapi et al. |
| 7,584,274 B2 | 9/2009 | Bond et al. |
| 7,620,986 B1 | 11/2009 | Jagannathan et al. |
| 7,636,764 B1 | 12/2009 | Fein et al. |
| 7,684,876 B2 | 3/2010 | Grgic |
| 7,693,581 B2 | 4/2010 | Callaghan et al. |
| 7,799,273 B2 | 9/2010 | Popp |
| 7,870,106 B1 | 1/2011 | Nguyen et al. |
| 7,873,719 B2 | 1/2011 | Bishop et al. |
| 7,886,065 B1 | 2/2011 | Satish et al. |
| 7,957,335 B2 | 6/2011 | Durazzo et al. |
| 8,204,717 B2 | 6/2012 | McLaughlin et al. |
| 2002/0078382 A1 | 6/2002 | Sheikh et al. |
| 2003/0014498 A1 | 1/2003 | Kreidler et al. |
| 2003/0120778 A1 | 6/2003 | Chaboud et al. |
| 2003/0182359 A1 | 9/2003 | Vorchik et al. |
| 2004/0002943 A1 | 1/2004 | Merrill et al. |
| 2004/0128539 A1 | 7/2004 | Shureih |
| 2005/0021594 A1 | 1/2005 | Bernardin et al. |
| 2005/0195840 A1 | 9/2005 | Krapp et al. |
| 2005/0276228 A1 | 12/2005 | Yavatkar et al. |
| 2005/0278441 A1 | 12/2005 | Bond et al. |
| 2006/0004786 A1 | 1/2006 | Chen et al. |
| 2006/0059163 A1 | 3/2006 | Frattura et al. |
| 2006/0085393 A1 | 4/2006 | Modesitt |
| 2006/0155633 A1 | 7/2006 | Fellenstein et al. |
| 2006/0184626 A1 | 8/2006 | Agapi et al. |
| 2006/0230149 A1 | 10/2006 | Jackson |
| 2007/0050328 A1* | 3/2007 | Li ................... G06F 16/9032 |
| 2007/0055702 A1 | 3/2007 | Fridella et al. |
| 2008/0120414 A1 | 5/2008 | Kushalnagar et al. |
| 2008/0159289 A1 | 7/2008 | Narayanan et al. |
| 2008/0208361 A1 | 8/2008 | Grgic |
| 2008/0270523 A1 | 10/2008 | Parmar et al. |
| 2008/0295173 A1 | 11/2008 | Tsvetanov |
| 2009/0058088 A1 | 3/2009 | Pitchford et al. |
| 2009/0125370 A1 | 5/2009 | Blondeau et al. |
| 2009/0132070 A1 | 5/2009 | Ebrom et al. |
| 2009/0172035 A1 | 7/2009 | Lessing et al. |
| 2009/0210071 A1 | 8/2009 | Agrusa et al. |
| 2009/0271012 A1 | 10/2009 | Kopka et al. |
| 2009/0300151 A1 | 12/2009 | Friedman et al. |
| 2009/0300210 A1 | 12/2009 | Ferris |
| 2009/0300635 A1 | 12/2009 | Ferris |
| 2010/0022231 A1 | 1/2010 | Heins et al. |
| 2010/0023151 A1 | 1/2010 | Shieh et al. |
| 2010/0042720 A1 | 2/2010 | Stienhans et al. |
| 2010/0256794 A1 | 10/2010 | McLaughlin et al. |
| 2010/0257227 A1 | 10/2010 | McLaughlin et al. |
| 2010/0257228 A1 | 10/2010 | Staggs et al. |
| 2010/0257605 A1 | 10/2010 | McLaughlin et al. |
| 2011/0055118 A1* | 3/2011 | Sanford ............ G05B 23/0245 705/500 |
| 2014/0351642 A1* | 11/2014 | Bates ................ G06F 11/0709 714/26 |
| 2016/0116378 A1* | 4/2016 | Bates ................ G06N 99/005 702/182 |

OTHER PUBLICATIONS

Kevin P. Staggs et al., "Cloud Computing for an Industrial Automation and Manufacturing System", U.S. Appl. No. 12/416,859, filed Apr. 1, 2009, 28 pgs.

Paul F. McLaughlin et al., "Cloud Computing for a Manufacturing Execution System", U.S. Appl. No. 12/416,790, filed Apr. 1, 2009, 28 pgs.

Paul F. McLaughlin et al., "Cloud Computing as a Basis for a Process Historian", U.S. Appl. No. 12/416,830, filed Apr. 1, 2009, 28 pgs.

"Real-Time Data Hosting . . . ", www.industrialevolution.com/ms_services_host.html, 1 page, Jan. 2000.

Notification of Transmittal of the International Search Report and the Written Opinion of the International Searching Authority, or the Declaration dated Oct. 29, 2010 in connection with International Patent Application No. PCT/US2010/028218, 10 pgs.

Notification of Transmittal of the International Search Report and the Written Opinion of the International Searching Authority, or the Declaration dated Oct. 29, 2010 in connection with International Patent Application No. PCT/US2010/028210, 9 pgs.

Notification of Transmittal of the International Search Report and the Written Opinion of the International Searching Authority, or the Declaration dated Oct. 29, 2010 in connection with International Patent Application No. PCT/US2010/028208, 9 pgs.

Jan Zirnstein et al., "Cost-Driven System and Method for Predictive Equipment Failure Detection", U.S. Appl. No. 15/053,798, filed Feb. 25, 2016, 36 pgs.

David J. Germann et al., "System and Method for Asset Fleet Monitoring and Predictive Diagnostics Using Analytics for Large and Varied Data Sources", U.S. Appl. No. 14/871,205, filed Sep. 30, 2015, 35 pgs.

\* cited by examiner

CALIBRATION TECHNIQUE FOR RULES USED WITH ASSET MONITORING IN INDUSTRIAL PROCESS CONTROL AND AUTOMATION SYSTEMS

TECHNICAL FIELD

This disclosure relates generally to techniques for identifying faulty equipment. More specifically, this disclosure relates to a calibration technique for rules used with asset monitoring in industrial process control and automation systems.

BACKGROUND

Industrial process control and automation systems are routinely used to automate large and complex industrial processes. The industrial processes often include a large amount of industrial equipment, and each piece of industrial equipment may fail or experience some other type of fault one or more times during its operational lifetime. "Asset monitoring" generally refers to a process that involves collecting information about assets, processing the information using a set of algorithmic rules, and publishing alerts to human operators when potential faults with the assets are detected using the rules.

SUMMARY

This disclosure provides a calibration technique for rules used with asset monitoring in industrial process control and automation systems.

In a first embodiment, a method includes identifying a statistical performance of a monitoring rule associated with an asset monitoring system. The monitoring rule includes logic configured to identify one or more faults with at least one asset, and the statistical performance includes an effectiveness of the monitoring rule in identifying the one or more faults. The method also includes identifying an economic performance of the monitoring rule, where the economic performance is based on costs associated with different outcomes of the monitoring rule. The method further includes updating or replacing the monitoring rule based on the economic performance.

In a second embodiment, an apparatus includes at least one processing device configured to identify a statistical performance of a monitoring rule associated with an asset monitoring system. The monitoring rule includes logic configured to identify one or more faults with at least one asset, and the statistical performance includes an effectiveness of the monitoring rule in identifying the one or more faults. The at least one processing device is also configured to identify an economic performance of the monitoring rule, where the economic performance is based on costs associated with different outcomes of the monitoring rule. The at least one processing device is further configured to update or replace the monitoring rule based on the economic performance.

In a third embodiment, a non-transitory computer readable medium contains computer readable program code that, when executed by at least one processing device, causes the at least one processing device to identify a statistical performance of a monitoring rule associated with an asset monitoring system. The monitoring rule includes logic configured to identify one or more faults with at least one asset, and the statistical performance includes an effectiveness of the monitoring rule in identifying the one or more faults. The medium also contains computer readable program code that, when executed by the at least one processing device, causes the at least one processing device to identify an economic performance of the monitoring rule, where the economic performance is based on costs associated with different outcomes of the monitoring rule. The medium further contains computer readable program code that, when executed by the at least one processing device, causes the at least one processing device to update or replace the monitoring rule based on the economic performance.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
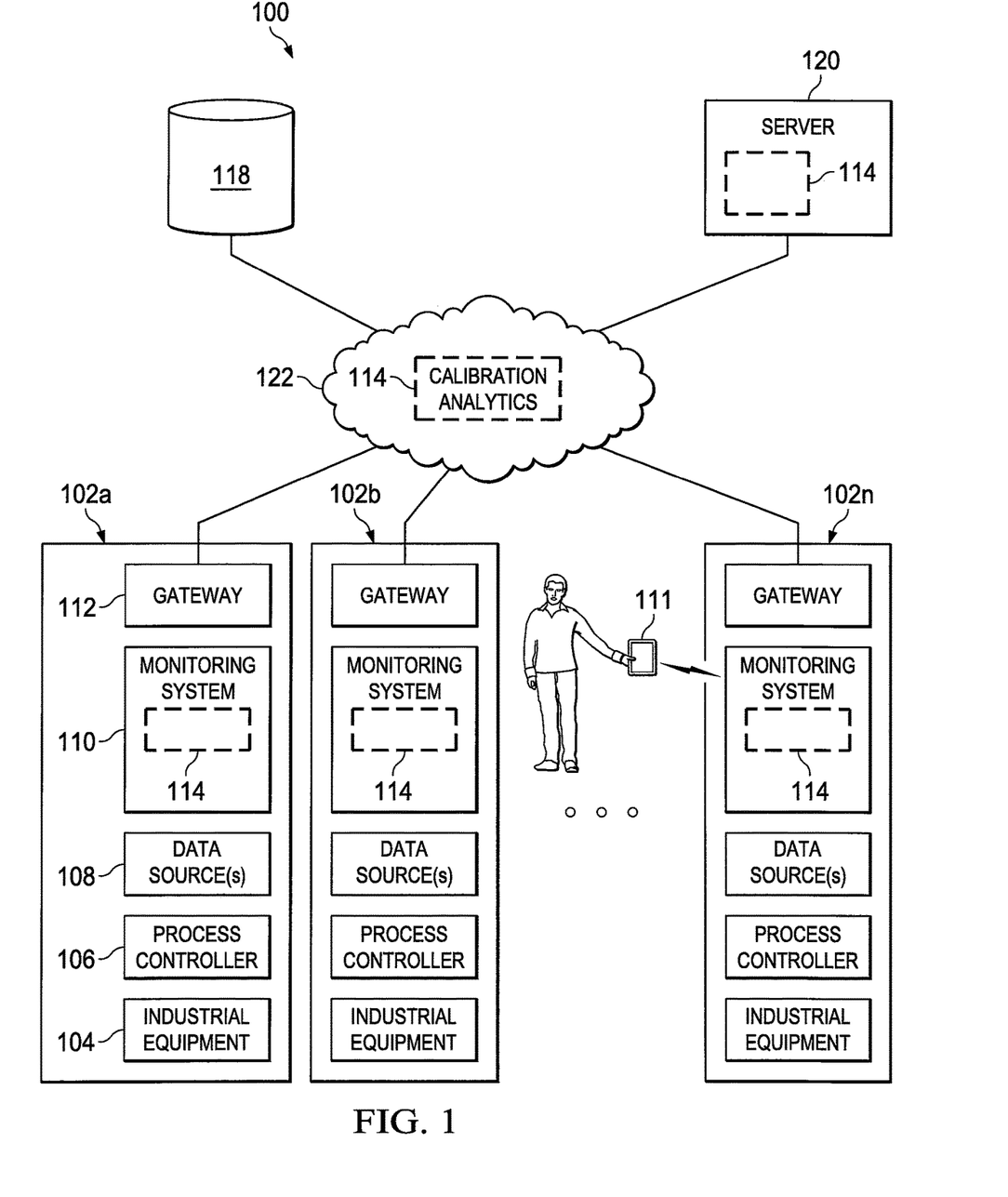
FIG. 1 illustrates an example system for asset monitoring according to this disclosure.

FIG. 1 illustrates an example system 100 for asset monitoring according to this disclosure. As shown in FIG. 1, the system 100 includes one or multiple sites 102a-102n. Each site 102a-102n generally denotes a location at which one or more pieces of monitored industrial equipment 104 are used. Different sites 102a-102n could denote different areas or zones within a single larger site or different areas or zones that are separated by small or large distances. Note that different areas or zones do not require physical separation but merely logical separation of equipment, so equipment that is side-by-side could be identified within different sites. Also, all sites 102a-102n could be associated with the same organization (such as a national or multi-national corporation), or different sites 102a-102n could be associated with different organizations (such as small or large national or multi-national corporations).

The industrial equipment 104 at each site 102a-102n represents industrial equipment whose operation can be monitored using various monitoring rules as described below. As examples, the industrial equipment 104 could include machines with rotating components, such as compressors, pumps, turbines, motors, or engines. The industrial equipment 104 could also include machines with heat transfer equipment, such as heat exchangers, heaters, or boilers. The industrial equipment 104 could further include general process equipment, such as reactors, vessels, and columns. In general, the industrial equipment 104 includes any suitable industrial equipment whose operations are monitored.

Each site 102a-102n may include one or more industrial process controllers 106, which are used to control the operations of the industrial equipment 104. Often times, process controllers 106 are arranged hierarchically at a site 102a-102n, with different levels performing different functions. For example, a lower-level controller 106 may use measurements from one or more sensors to control the operations of one or more actuators in order to monitor and adjust the overall operation of the industrial equipment 104. A higher-level controller 106 could perform planning, scheduling, or optimization functions to adjust the operation of the lower-level controller 106. Each controller 106 includes any suitable structure for controlling at least one aspect of an industrial site. A controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system, a WINDOWS operating system, or other operating system.

Each site 102a-102n may also include one or more data sources 108. Each data source 108 could represent a component that stores various information about or related to the site 102a-102n. For example, a data source 108 could store information defining monitoring rules to be used by other components to detect faults with the industrial equipment 104. A data source 108 could also store information collected or generated by the process controllers 106, sensors, actuators, or other components in a site. This type of information is often referred to as "instrumentation" data. The data source 108 could further store information identifying prior failures or other historical faults with the industrial equipment 104. This information could take various forms, such as maintenance records identifying actual faults with the industrial equipment 104 and maintenance performed on the industrial equipment 104. The amount of information stored by the data sources 108 could vary in numerous ways, such as from site to site or from organization to organization. In some cases, a data source 108 could be used to store months or even years of data related to operation of an industrial site 102a-102n. Each data source 108 represents any suitable structure for storing and facilitating retrieval of information, such as process historians, maintenance logs, and other sources of process-related data.

Each site 102a-102n may further include one or more monitoring systems 110. A monitoring system 110 at a site 102a-102n could be used to monitor industrial equipment 104 online at that site and issue alerts, warnings, or other notifications automatically if any monitoring rules are violated. For example, when faults with industrial equipment 104 are identified, the monitoring systems 110 could issue notifications to end-user devices 111 used by personnel associated with the industrial equipment 104. Example types of notifications could include text messages and emails sent to portable end-user devices 111, alarms or other graphical indicators displayed on screens of end-user devices 111 in control rooms, or any other suitable notifications. The monitoring rules used by the monitoring systems 110 could be stored in the data sources 108, in the monitoring systems 110, or at any other suitable locations. Each monitoring system 110 includes any suitable structure supporting the online monitoring of industrial equipment.

In addition, each site 102a-102n may include one or more gateways 112. Each gateway 112 allows data transfers to or from a site 102a-102n. For example, a gateway 112 may allow one or more data sources 108 at a particular site 102a-102n to be accessed remotely so that data from the data source(s) 108 can be retrieved. As another example, a gateway 112 may allow a data source 108 or a monitoring system 110 at a particular site 102a-102n to be accessed remotely so that monitoring rules can be updated or replaced. Each gateway 112 could support any other or additional operations, depending on the implementation and the site 102a-102n at which the gateway 112 is used. Each gateway 112 includes any suitable structure supporting bi-directional communication with an industrial site.

While not shown, one or more networks can be used to support communications between various components within each site 102a-102n. For example, one or more proprietary or standard control networks could couple one or more process controllers 106 to industrial equipment 104. Also, one or more proprietary or standard data networks could couple one or more process controllers 106, data sources 108, monitoring systems 110, and gateways 112 together. In particular embodiments, each site 102a-102n could be arranged according to the "Purdue" model of process control.

As noted above, "asset monitoring" generally refers to a process that involves collecting information about assets (such as the industrial equipment 104), processing the information using a set of algorithmic rules, and publishing alerts or other notifications to human operators when potential faults with the assets are detected using the rules. Traditionally, monitoring rules have been configured, designed, and deployed using engineering insights provided by human personnel associated with a site. Since this approach is dependent on the person designing the monitoring rules, there can be a large amount of person-to-person variability in the monitoring rules. Moreover, monitoring rules are not subsequently analyzed to measure their ability to predict real faults and are therefore suboptimal in their performance, and the design of the monitoring rules rarely takes into account cost considerations of different outcomes of the monitoring rules. Example outcomes of a monitoring rule include a true positive, a true negative, a false positive, and a false negative. A true positive means a monitoring rule accurately predicts that a fault exists and maintenance is needed. A true negative means a monitoring rule accurately predicts that no fault exists and maintenance is not needed. A false positive means a monitoring rule predicts that a fault exists and maintenance is needed when no fault exists and maintenance is not needed. A false negative means a monitoring rule fails to predict a fault and determines that maintenance is not needed when a fault exists and maintenance is needed. Each of these outcomes is typically associated with an economic cost, and the traditional approach for designing asset monitoring rules does not contemplate these costs.

In accordance with this disclosure, a cost-based analysis is used to evaluate an asset monitoring rule's performance against historical data and to compute the economic impact of the monitoring rule. This disclosure also provides a systematic framework for the design and tuning of an asset monitoring rule, which can help to provide improved or optimal economic performance.

The system 100 of FIG. 1 supports these features by executing calibration analytics 114 at one or more locations.

The calibration analytics 114 represent one or more software routines or other logic that identifies a monitoring rule's effectiveness in predicting faults in order to calculate different outcome rates for the monitoring rule. The outcome rates could include the rule's rates for true positives, true negatives, false positives, and false negatives. The calibration analytics 114 also construct a cost function associated with the monitoring rule using the different outcome rates and various costs associated with the different outcomes. Note that in some embodiments, certain outcomes (such as true negatives) could be excluded from this analysis. For example, the cost of a true negative result could be zero since a monitoring rule that successfully identifies no fault will typically not incur any maintenance costs or other costs. However, this need not be the case.

The calibration analytics 114 could use this approach to identify how existing monitoring rules may be updated or to generate new monitoring rules, where the updated or new monitoring rules provide improved economic benefits during fault monitoring. The updated or new monitoring rules could then be made available to the monitoring systems 110 for use in monitoring the industrial equipment 104. The updated or new monitoring rules could be provided in any suitable manner, such as automatically or after user approval of the monitoring rules.

As shown in FIG. 1, the calibration analytics 114 could be provided in various ways. For example, in some embodiments, data associated with one or more sites 102a-102n is collected in at least one database 118, and the calibration analytics 114 could be executed by one or more servers 120 or other standalone computing devices. Each server 120 could include one or more processing devices, one or more memories, and one or more interfaces. Each processing device includes any suitable processing or computing device, such as a microprocessor, microcontroller, digital signal processor, field programmable gate array, application specific integrated circuit, or discrete logic devices. Each memory includes any suitable storage and retrieval device, such as a RAM or Flash or other ROM. Each interface includes any suitable structure facilitating communication over a connection or network, such as a wired interface (like an Ethernet interface) or a wireless interface (like a radio frequency transceiver).

In other embodiments, the calibration analytics 114 could be executed within a network-based environment 122, such as a computing cloud. The network-based environment 122 could include various components that support network-based analysis of industrial equipment. For example, the network-based environment 122 could include servers or other computing devices executing logic that analyzes data associated with the industrial equipment, as well as database servers or other computing devices for storing data used by the logic. As is typical with computing clouds, the specific device or devices executing the calibration analytics 114 can change over time, such as when different servers are selected at different times for executing the calibration analytics 114 based on load balancing or other factors.

The calibration analytics 114 could further be executed within an individual site or a collection of sites 102a-102n. For example, the calibration analytics 114 could be executed as part of the monitoring system 110 within a site 102a-102n or by another device or system within the site 102a-102n.

Although FIG. 1 illustrates one example of a system 100 for asset monitoring, various changes may be made to FIG. 1. For example, the system 100 could include any number of sites, pieces of industrial equipment, controllers, data sources, monitoring systems, gateways, calibration analytics, servers, databases, and network-based environments. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, systems such as this are highly configurable and can be configured in any suitable manner according to particular needs. In addition, FIG. 1 illustrates one example environment in which the functions of the calibration analytics 114 can be used. This functionality can be used in any other suitable device or system.

Figure 2:
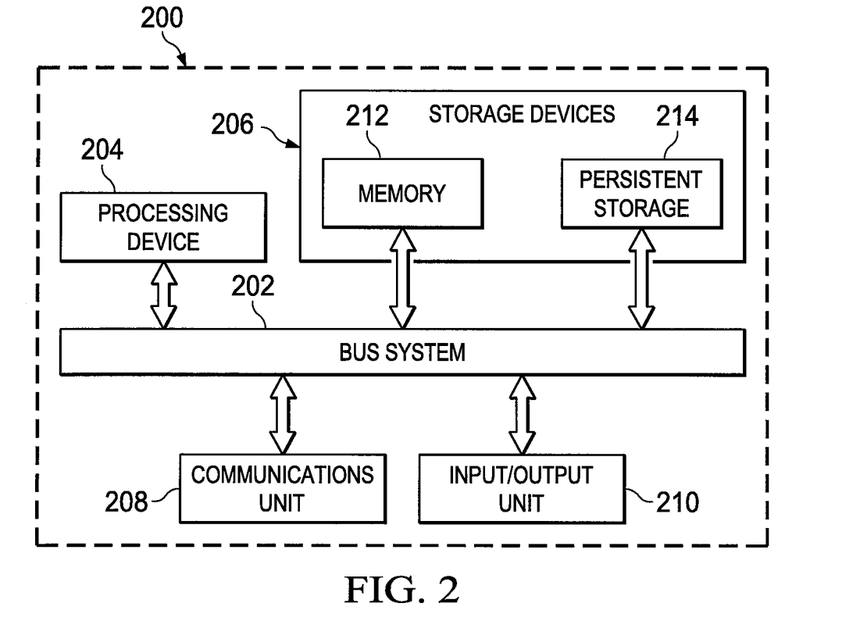
FIG. 2 illustrates an example device for calibration of rules used for asset monitoring according to this disclosure.

FIG. 2 illustrates an example device 200 for calibration of rules used for asset monitoring according to this disclosure. The device 200 could, for example, be used to execute part or all of the calibration analytics 114. As particular examples, the device 200 could represent the server 120, one or more components within the network-based environment 122, or one or more components within a site 102a-102n. The device 200 could, among other things, analyze data to identify the statistical and economic performance of monitoring rules and use this information to identify improvements to the monitoring rules or to generate new monitoring rules. Note, however, that the calibration analytics 114 could be implemented using any other suitable device(s).

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 includes any suitable number(s) and type(s) of processors or other processing devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface card that facilitates communications over at least one Ethernet network or other wired network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

Although FIG. 2 illustrates one example of a device 200 for calibration of rules used for asset monitoring, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

Figure 3:
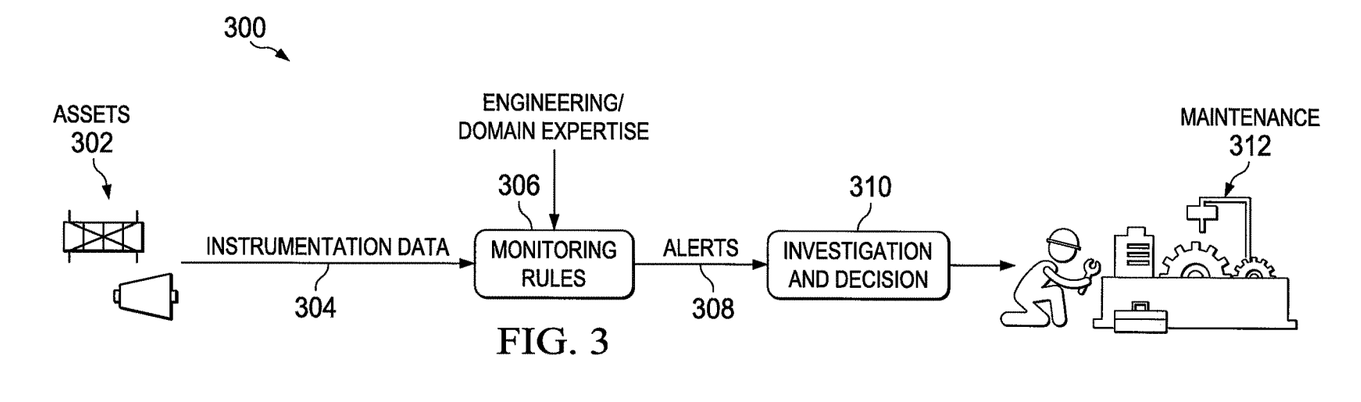
FIG. 3 illustrates an example technique for rule-based monitoring of assets according to this disclosure.

FIG. 3 illustrates an example technique 300 for rule-based monitoring of assets according to this disclosure. For ease of explanation, the technique 300 shown in FIG. 3 is described with respect to the system 100 of FIG. 1. However, rule-based monitoring of assets could be implemented in any suitable manner and in any suitable system.

As shown in FIG. 3, one or more assets 302 are being monitored. The assets 302 could denote any suitable industrial equipment, such as one or more pieces of industrial equipment 104 at one or multiple sites 102a-102n. Instrumentation data 304 is associated with the one or more assets 302. The instrumentation data 304 represents any suitable information identifying or related to the operation of the assets 302. As noted above, the instrumentation data 304 can include information generated by the process controllers 106, sensors, actuators, or other components in one or more sites.

The instrumentation data 304 is provided to one or more monitoring rules 306. Note that pre-processing of the instrumentation data 304 could occur prior to use by the monitoring rules 306. Each monitoring rule 306 denotes some form of logic that processes the instrumentation data 304 in order to determine whether one or more actual or potential faults exist with the assets 302. The monitoring rules 306 are often initially designed using human expertise, although this can create various problems as described above. Those problems include variability of monitoring rules between different people and failure to consider economic costs and other impacts of the monitoring rules.

The monitoring rules 306 analyze the instrumentation data 304 and, if appropriate, generate alerts or other notifications 308 for appropriate personnel. The notifications 308 can take various forms, such as text messages, emails, or alarms or other graphical indicators. In response to each notification 308, an investigation and decision process 310 is typically performed. In many instances, this process 310 is a manual process in which human personnel analyze data, perform manual inspections of assets 302, and decide whether maintenance of the assets 302 is actually needed. In other implementations, this process 310 could be automated to at least some extent. If necessary, a maintenance process 312 can be initiated so that repairs or replacements of the assets 302 can occur.

As described in more detail below, the calibration analytics 114 can be used to identify both the statistical and economic performance of each monitoring rule 306. Based on this information, the calibration analytics 114 can determine if any of the monitoring rules 306 should be modified or replaced in order to increase economic benefits to the operators of the assets 302.

Although FIG. 3 illustrates one example of a technique 300 for rule-based monitoring of assets, various changes may be made to FIG. 3. For example, the technique 300 could involve any number of monitoring rules associated with any number of assets.

Figure 4:
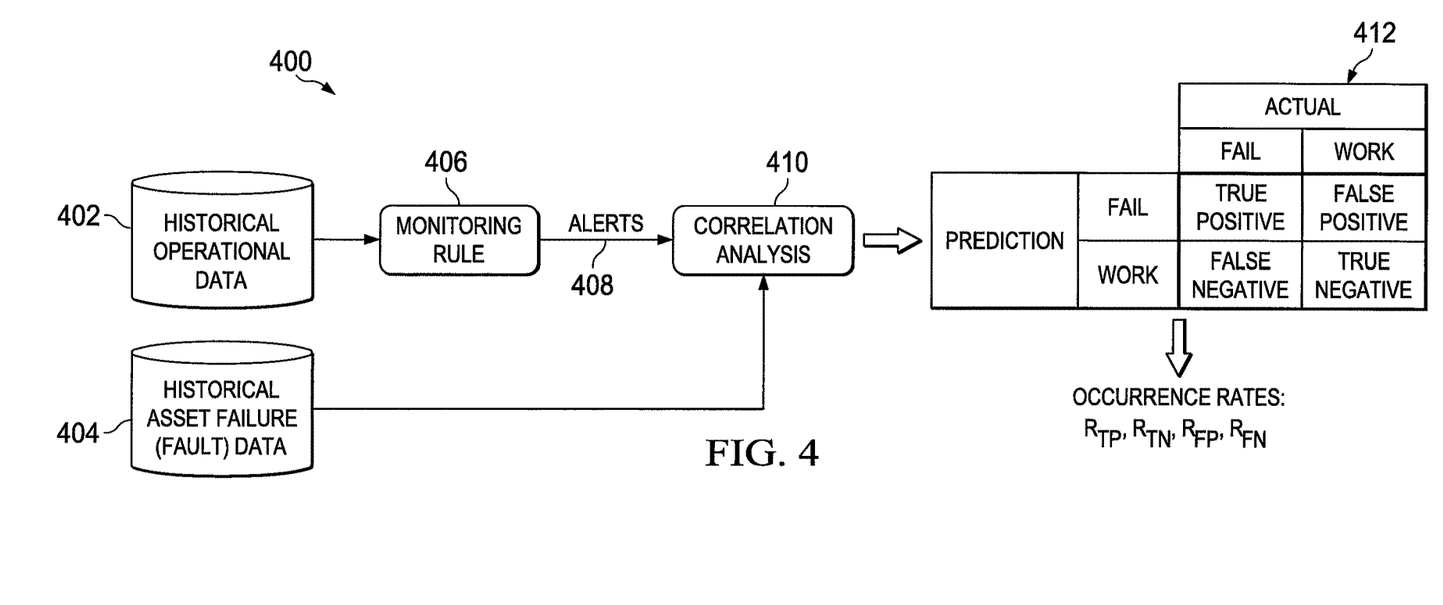
FIG. 4 illustrates an example technique for identifying a statistical performance of a monitoring rule according to this disclosure.

FIG. 4 illustrates an example technique 400 for identifying a statistical performance of a monitoring rule according to this disclosure. For ease of explanation, the technique 400 shown in FIG. 4 is described as being performed by the calibration analytics 114 operating in the system 100 of FIG. 1. However, this technique could be implemented in any suitable manner and in any suitable system.

As described above, the calibration analytics 114 can determine both the statistical performance and the economic performance of a monitoring rule. The statistical performance of a monitoring rule identifies the effectiveness of the monitoring rule and, in some implementations, can be expressed as the rates at which the monitoring rule generates true positive results, true negative results, false positive results, and false negative results. As noted above, certain outcomes (such as true negative results) may or may not form part of this analysis.

As shown in FIG. 4, the technique 400 involves the use of two types of data. A database 402 generally includes historical operational data associated with at least one asset. The historical operational data typically (but not always) includes instrumentation data. For example, the historical operational data could denote the instrumentation data 304 associated with one or more assets 302. The operational data in the database 402 could span any suitable length of time, ideally a prolonged period of time during which multiple faults occurred with the assets 302.

A database 404 generally includes historical asset failure (fault) data associated with at least one asset. For example, the historical asset failure data could denote maintenance records or other information identifying the occurrences of known faults with one or more assets 302. The asset failure data in the database 404 could span any suitable length of time, ideally a prolonged period of time during which multiple faults occurred with the assets 302.

Note that while shown here as two separate databases 402 and 404, the historical operational data and the historical asset failure data could be stored in any number of physical databases, including a single database. Also note that the databases 402 and 404 could denote existing databases at one or more sites 102a-102n (such as data sources 108) or one or more databases constructed based on information from one or more sites 102a-102n or other locations.

The calibration analytics 114 can obtain the historical operational data and analyze the historical operational data using a monitoring rule 406. The monitoring rule 406 denotes a rule that is used or could be used to monitor at least one actual asset. The calibration analytics 114 analyze the historical operational data by applying the monitoring rule 406 to the historical operational data. This is done in order to see what alerts or other notifications would have been generated if the monitoring rule 406 had been in use when the historical operational data was first generated. The result of this process is a set of one or more notifications 408 generated by the monitoring rule 406.

The calibration analytics 114 perform a correlation analysis 410 to compare the notifications 408 generated by the monitoring rule 406 with the historical asset failure data. This allows the calibration analytics 114 to identify the effectiveness of the monitoring rule 406 by identifying how well the monitoring rule 406 identifies actual failures or other faults of the assets without false positives or false negatives. In this case, the correlation analysis 410 generates a set of results 412 in the form of different rates for the monitoring rule's outcomes. The outcomes here include the rate of true positives, the rate of true negatives, the rate of false positives, and the rate of false negatives (although one of more of these could be omitted). The results 412 quantify the historical performance of the monitoring rule 406 for a given set of historical operational data.

With the statistical performance of the monitoring rule 406 identified, the calibration analytics 114 can determine the economic performance of the monitoring rule 406. The economic performance is based on costs associated with different outcomes of the monitoring rule 406. In general, a notification 408 from the monitoring rule 406 typically leads to a business decision that has some type of monetary cost associated with the decision. As examples, for a true positive where maintenance is actually required and properly identified, a spare part can be ordered and shipped to a site, and a repair or replacement can be made with the spare part and a prepared staff before, during, or after an asset fails. The cost of the true positive $C_{TP}$ could denote a combination of costs, such as spare part costs, transportation costs, installation costs, and any process interruption costs. For a false positive where maintenance is improperly identified but not actually required, a spare part can be ordered and shipped to a site, an asset does not fail, and the spare part can be shipped back to a warehouse or vendor. The cost of the false positive $C_{FP}$ could denote a combination of costs, such as transportation costs, part degradation costs, and any return costs for the part. For a false negative where maintenance is actually required but not identified, no alert is raised, an asset fails and goes down, production is impacted, and an emergency call for parts and personnel is made. The cost of the false negative $C_{FN}$ could denote a combination of costs, such as spare part costs, urgent transportation costs, installation costs, and process interruption costs.

Numerical values for $C_{TP}$, $C_{FP}$, and $C_{FN}$ are often a function of a particular entity's business. These values are often known or are knowable (either exactly or approximately) by the entity's personnel. An economic cost function J can then be constructed using this information. In some embodiments, the economic cost function J can be expressed as:

$$J = C_{TP} \times R_{TP} + C_{TN} \times R_{TN} + C_{FP} \times R_{FP} + C_{FN} \times R_{FN}$$

where $C_{xy}$ refers to the costs of the different monitoring rule outcomes and $R_{xy}$ refers to the rates of the different monitoring rule outcomes (such as those calculated as shown in FIG. 4). In some embodiments, $C_{TP}$ and $C_{TN}$ values could be expressed as positive values, while $C_{FP}$ and $C_{FN}$ values could be expressed as negative values (or vice versa).

The calibration analytics 114 can use the economic cost function in various ways to improve monitoring rules or to improve the use of the monitoring rules. For example, the calibration analytics 114 could use the economic cost function to identify one or more tuning parameter values of the monitoring rule 406 that improve or optimize the economic cost function. Since individual costs may reasonably be considered outside the scope of the monitoring rules, the optimization of the economic function is influenced by optimizing the rates $R_{TP}$, $R_{FP}$, and $R_{FN}$ (usually with the intuitive goal of maximizing $R_{TP}$ while minimizing $R_{FP}$ and $R_{FN}$). Example ways for using an economic cost function to identify one or more tuning parameter values of a monitoring rule 406 are provided below.

Although FIG. 4 illustrates one example of a technique 400 for identifying a statistical performance of a monitoring rule, various changes may be made to FIG. 4. For example, if the same monitoring rule 406 is used for a lengthy period of time to analyze actual asset data, the actual notifications 408 generated by the monitoring rule 406 could be used and compared to the actual faults in the assets. In this case, there may be no need for obtaining historical operational data and applying the monitoring rule 406 to the historical operational data.

Figure 5:
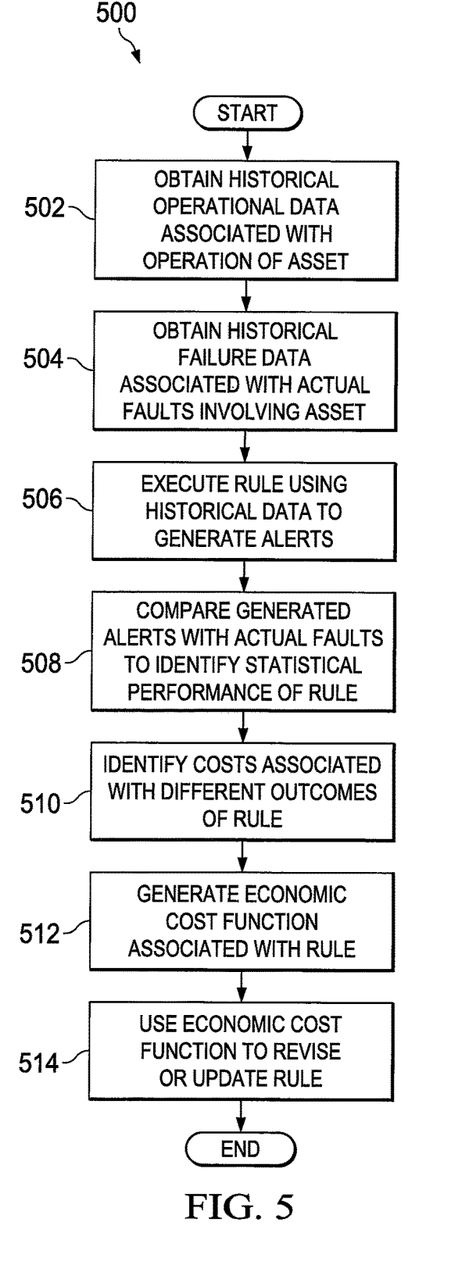
FIG. 5 illustrates a first example method for calibration of rules used for asset monitoring according to this disclosure.

FIG. 5 illustrates a first example method 500 for calibration of rules used for asset monitoring according to this disclosure. For ease of explanation, the method 500 shown in FIG. 5 is described as being performed by the calibration analytics 114 operating in the system 100 of FIG. 1. However, the method 500 could be implemented in any suitable manner and in any suitable system.

As shown in FIG. 5, historical operational data associated with at least one asset is obtained at step 502, and actual historical failure (fault) data associated with the at least one asset is obtained at step 504. This could include, for example, the processing device 204 of the device/system that executes the calibration analytics 114 obtaining the data from one or more databases 402 and 404. The data could be obtained in any suitable manner, such as by using any suitable database queries.

At least one monitoring rule is executed using the historical data to generate alerts or other notifications at step 506. This could include, for example, the processing device 204 of the device/system that executes the calibration analytics 114 applying at least one monitoring rule 406 to the data retrieved from the database 402. This, in effect, provides an indication of how each monitoring rule 406 would have behaved had the monitoring rule 406 been in use when the historical operational data was received by a monitoring system 110.

The generated alerts or other notifications are compared with actual faults of the at least one asset to identify the statistical performance of the at least one monitoring rule at step 508. This could include, for example, the processing device 204 of the device/system that executes the calibration analytics 114 comparing the notifications 408 generated by the at least one monitoring rule 406 with actual known faults of the at least one asset. This is done to see how well the at least one monitoring rule 406 would have successfully identified the known faults. From this, the processing device 204 of the device/system that executes the calibration analytics 114 can identify statistical values associated with outcomes of the at least one monitoring rule 406, such as the rates of true positives, true negatives, false positives, and false negatives for the monitoring rule 406 (although one or more outcomes may be discarded in the analysis).

Costs associated with different outcomes of the at least one monitoring rule are identified at step 510 and used to generate at least one economic cost function associated with the at least one monitoring rule at step 512. This could include, for example, the processing device 204 of the device/system that executes the calibration analytics 114 querying a user or a database to obtain values for the costs associated with the true positive, true negative, false positive, and false negative outcomes of the at least one monitoring rule 406. The economic cost function could have the form shown above or any other suitable form that considers the different outcomes of a monitoring rule and the costs of those different outcomes.

The at least one economic cost function can be used in any suitable manner, such as to revise or update the at least one monitoring rule at step 514. This could include, for example, the processing device 204 of the device/system that executes the calibration analytics 114 varying the tuning parameter value(s) of a monitoring rule and identifying which tuning parameter value(s) provide an improved or optimized cost. One example of this approach is described below.

Although FIG. 5 illustrates one example of a method 500 for calibration of rules used for asset monitoring, various changes may be made to FIG. 5. For example, while shown as a series of steps, various steps in FIG. 5 could overlap, occur in parallel, occur in a different order, or occur any number of times. Also, various steps in FIG. 5 could be omitted, such as when actual alerts or other notifications generated by a monitoring rule are available (so steps 502 and 506 may be unnecessary).

Figure 6:
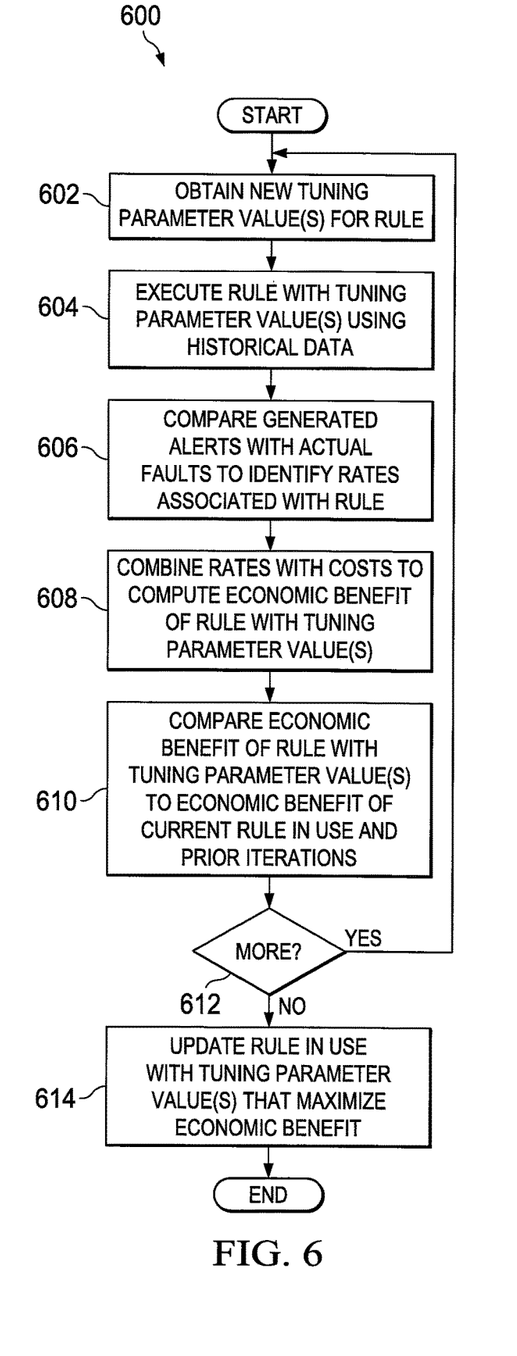
FIG. 6 illustrates a second example method for calibration of rules used for asset monitoring according to this disclosure.

FIG. 6 illustrates a second example method 600 for calibration of rules used for asset monitoring according to this disclosure. The method 600 is an extension of the method 500 shown in FIG. 5 and provides one example technique for updating or revising a monitoring rule based on economic cost as shown in step 514 of FIG. 5. For ease of explanation, the method 600 shown in FIG. 6 is described as being performed by the calibration analytics 114 operating in the system 100 of FIG. 1. However, the method 600 could be implemented in any suitable manner and in any suitable system.

As shown in FIG. 6, one or more tuning parameter values for a monitoring rule are obtained at step 602. This could include, for example, the processing device 204 of the device/system that executes the calibration analytics 114 obtaining the one or more tuning parameter values automatically or from a user. The monitoring rule with the new tuning parameter value(s) is executed at step 604. This could include, for example, the processing device 204 of the device/system that executes the calibration analytics 114 applying the monitoring rule 406 with the new tuning parameter value(s) to the historical operational data retrieved from the database 402. This, in effect, provides an indication of how the monitoring rule 406 would have behaved had the monitoring rule 406 been in use when the historical operational data was received by a monitoring system 110.

Alerts or other notifications generated by the monitoring rule with the new tuning parameter value(s) are compared with actual faults of at least one asset to identify outcome rates associated with the monitoring rule at step 606. This could include, for example, the processing device 204 of the device/system that executes the calibration analytics 114 identifying the rates of true positives, true negatives, false positives, and false negatives for the monitoring rule 406 with the new tuning parameter value(s) (although one or more of the outcomes could be discarded).

The rates are combined with costs of the different outcomes to compute a value of an economic benefit associated with the monitoring rule with the new tuning parameter value(s) at step 608. This could include, for example, the processing device 204 of the device/system that executes the calibration analytics 114 querying a user or a database to obtain values for the costs associated with the true positive, true negative, false positive, and false negative outcomes of the monitoring rule 406 with the new tuning parameter value(s). The economic cost function could have the form shown above or any other suitable form that considers the different outcomes of a monitoring rule and the costs of those different outcomes.

The economic benefit for the current iteration of the method 600 is compared to the economic benefit of the actual rule in use (without the new tuning parameter value(s)) and any other iterations of the method 600 (with different tuning parameter value(s)) at step 610. This could include, for example, the processing device 204 of the device/system that executes the calibration analytics 114 determining whether the new tuning parameter value(s) for the current iteration of the method 600 provide(s) a maximum economic benefit. The economic benefit of the rule currently in use could be identified using the cost function generated in step 512 in FIG. 5.

A decision is made whether more new tuning parameter values are to be analyzed during one or more subsequent iterations of the method 600 at step 612. If so, the process returns to step 602. Otherwise, the monitoring rule can be updated with the tuning parameter value(s) that increased or maximized the economic benefit at step 614. This could include, for example, the processing device 204 of the device/system that executes the calibration analytics 114 updating one or more tuning parameters of an actual monitoring rule used by at least one monitoring system 110 based on the identified tuning parameter value(s). The updating could be done automatically or in response to user input, such as based on user approval of the new tuning parameter value(s).

Note that during the method 600, the internal structure of the monitoring rule does not need to be known by the calibration analytics 114 in order for the calibration analytics 114 to update or revise the monitoring rule. However, if the internal structure of a monitoring rule is known, the calibration analytics 114 could consider the internal structure and perform some direct optimization technique of the economic cost function. Also, when the structure of a monitoring rule is not known, the calibration analytics 114 could support a brute force optimization of the monitoring rule by selecting values for the one or more tuning parameters between minimum and maximum thresholds and applying those values to the above procedure. As a particular example, the range between a tuning parameter's minimum and maximum thresholds could be divided into even or uneven intervals, and only those values falling in specific locations in the range may be selected for analysis using the method 600.

Although FIG. 6 illustrates another example of a method 600 for calibration of rules used for asset monitoring, various changes may be made to FIG. 6. For example, while shown as a series of steps, various steps in FIG. 6 could overlap, occur in parallel, occur in a different order, or occur any number of times.

Figure 7:
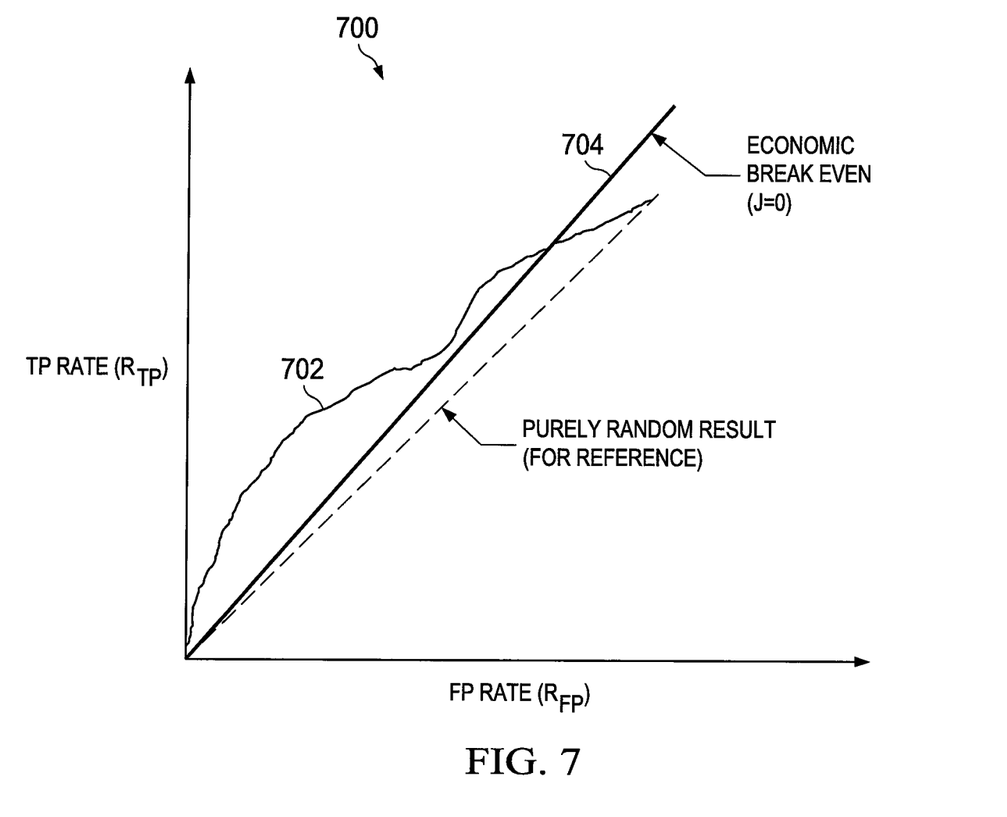
FIG. 7 illustrates example calibration results of rules used for asset monitoring according to this disclosure.

FIG. 7 illustrates example calibration results of rules used for asset monitoring according to this disclosure. In particular, FIG. 7 contains a graph 700 that illustrates potential cost savings associated with cost-based calibration of a monitoring rule. The graph 700 here includes a line 702 that reflects true positive rates relative to false positive rates for a particular piece of industrial equipment. The line 702 is generated by selecting various tuning parameter values and calculating economic benefits using the tuning parameter values as described above.

The graph 700 also plots a break-even cost line 704, which reflects points at which certain tuning parameter values have zero economic benefit. A zero economic benefit could, for example, result from costs associated with true positive outcomes being matched by costs associated with false positive and false negative outcomes. Ideally, a monitoring rule has rates of true positives, false positives, and false negatives such that the economic cost of the true positives outweighs the economic cost of the false positives and false negatives. As a result, points on the line 702 that lie above or to the left of the break-even line 704 are points where positive economic benefits can be obtained using the tuning parameter values associated with those points. Points on the line 702 that lie below or to the right of the break-even line 704 are points where negative economic benefits can be obtained using the tuning parameter values associated with those points.

Based on this, the tuning parameter value(s) associated with one of the points on the line 702 above or to the left of the break-even line 704 could be selected for use in revising or updating a monitoring rule. In some embodiments, the point on the line 702 that is furthest above the break-even line 704 could be selected since that point denotes the point that maximizes cost savings, and the tuning parameter value(s) associated with that point could be used. However, other approaches could be used for selecting the tuning parameter value(s) for a monitoring rule.

Although FIG. 7 illustrates one example of calibration results of rules used for asset monitoring, various changes may be made to FIG. 7. For example, any other suitable curves, points, and lines could be used depending on the equipment being monitored.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for monitoring assets in an industrial process control and automation system, the method comprising:
    obtaining from an asset monitoring system, historical operational data associated with at least one asset of the asset monitoring and obtaining historical failure data associated with faults of the at least one asset;
    generating alerts or notifications by executing at least one monitoring rule using the obtained historical operational data;
    identifying known faults by comparing the generated alerts or notifications with the faults of the at least one asset;
    identifying a statistical performance of the at least one monitoring rule associated with the asset monitoring system, the statistical performance comprising an effectiveness of the monitoring rule in identifying the known faults by identifying rates associated with different outcomes of the monitoring rule, the different outcomes including true positive outcomes, true negative outcomes, false positive outcomes, and false negative outcomes;
    identifying an economic performance of the monitoring rule, by generating at least one economic cost function associated with the at least one monitoring rule, wherein the processing device executes a calibration analytics querying of a user or a database to obtain values for the costs associated with the true positive, true negative, false positive, and false negative outcomes of the monitoring rule;
    identifying, by the calibration analytics, one or more tuning parameter values of the monitoring rule based on the at least one economic cost function; and
    updating or replacing the monitoring rule based on the economic performance to optimize asset monitoring by varying the at least one tuning parameter value of the monitoring rule to identify which parameter value provides improved or optimized cost.

2. The method of claim 1, wherein identifying the economic performance of the monitoring rule comprises generating a cost function based on the rates associated with the different outcomes of the monitoring rule and the costs associated with the different outcomes of the monitoring rule.

3. The method of claim 2, wherein:
    the true positive outcomes denote instances where the monitoring rule correctly identifies that the one or more faults with the at least one asset exist;
    the true negative outcomes denote instances where the monitoring rule correctly identifies that the one or more faults with the at least one asset do not exist;
    the false positive outcomes denote instances where the monitoring rule incorrectly identifies that the one or more faults with the at least one asset exist; and the false negative outcomes denote instances where the monitoring rule fails to identify that the one or more faults with the at least one asset exist.

4. The method of claim 3, wherein the cost function is expressed as:

$$J = C_{TP} \times R_{TP} + C_{TN} \times R_{TN} + C_{FP} \times R_{FP} + C_{FN} \times R_{FN}$$

wherein:
  J denotes a cost of the monitoring rule;
  $C_{TP}$ denotes a cost associated with the true positive outcomes;
  $R_{TP}$ denotes a rate associated with the true positive outcomes;
  $C_{TN}$ denotes a cost associated with the true negative outcomes;
  $R_{TN}$ denotes a rate associated with the true negative outcomes;
  $C_{FP}$ denotes a cost associated with the false positive outcomes;
  $R_{FP}$ denotes a rate associated with the false positive outcomes;
  $C_{FN}$ denotes a cost associated with the false negative outcomes; and
  $R_{FN}$ denotes a rate associated with the false negative outcomes.

5. The method of claim 1, wherein identifying the statistical performance of the monitoring rule comprises:
  obtaining historical operational data;
  executing the monitoring rule with the historical operational data to generate notifications; and
  comparing the notifications with occurrences of known faults.

6. The method of claim 1, wherein updating or replacing the monitoring rule comprises:
  obtaining one or more tuning parameter values for the monitoring rule; and
  identifying a statistical performance and an economic performance of the monitoring rule with the one or more tuning parameter values and identifying an economic benefit of using the monitoring rule with the one or more tuning parameter values.

7. The method of claim 6, wherein updating or replacing the monitoring rule further comprises:
  repeatedly obtaining the one or more tuning parameter values for the monitoring rule during multiple iterations;
  for each iteration, identifying the statistical performance and the economic performance of the monitoring rule with the one or more tuning parameter values for that iteration and identifying the economic benefit of using the monitoring rule with the one or more tuning parameter values for that iteration; and
  updating or replacing the monitoring rule using the one or more tuning parameter values associated with a selected one of the iterations.

8. The method of claim 7, wherein updating or replacing the monitoring rule further comprises:
  identifying the selected iteration as the iteration in which the one or more tuning parameter values provide a maximum economic benefit.

9. The method of claim 1, wherein updating or replacing the monitoring rule comprises providing the updated or new monitoring rule to the asset monitoring system for use in monitoring the at least one asset.

10. An apparatus for monitoring assets in an industrial process control and automation system comprising:
  at least one processing device configured to:
    obtain from an asset monitoring system, historical operational data associated with at least one asset and obtaining historical failure data associated with faults of the at least one asset;
    generate alerts or notifications by executing at least one monitoring rule using the obtained historical operational data;
    identify known faults by comparing the generated alerts or notifications with the faults of the at least one asset;
    identify a statistical performance of the at least one monitoring rule associated with an asset monitoring system, the statistical performance comprising an effectiveness of the monitoring rule in identifying the known faults by identifying rates associated with different outcomes of the monitoring rule, the different outcomes including true positive outcomes, true negative outcomes, false positive outcomes, and false negative outcomes;
    identify an economic performance of the monitoring rule, by generating at least one economic cost function associated with the at least one monitoring rule, wherein the processing device executes a calibration analytics querying of a user or a database to obtain values for the costs associated with the true positive, true negative, false positive, and false negative outcomes of the monitoring rule;
    identify one or more tuning parameter values of the monitoring rule based on the at least one economic cost function; and
    update or replace the monitoring rule based on the economic performance to optimize asset monitoring by varying at least one parameter value of the monitoring rule to identify which parameter value provides improved or optimized cost.

11. The apparatus of claim 10, wherein, to identify the economic performance of the monitoring rule, the at least one processing device is configured to generate a cost function based on the rates associated with the different outcomes of the monitoring rule and the costs associated with the different outcomes of the monitoring rule.

12. The apparatus of claim 11, wherein:
  the true positive outcomes denote instances where the monitoring rule correctly identifies that the one or more faults with the at least one asset exist;
  the true negative outcomes denote instances where the monitoring rule correctly identifies that the one or more faults with the at least one asset do not exist;
  the false positive outcomes denote instances where the monitoring rule incorrectly identifies that the one or more faults with the at least one asset exist; and
  the false negative outcomes denote instances where the monitoring rule fails to identify that the one or more faults with the at least one asset exist.

13. The apparatus of claim 12, wherein the cost function is expressed as:

$$J = C_{TP} \times R_{TP} + C_{TN} \times R_{TN} + C_{FP} \times R_{FP} + C_{FN} \times R_{FN}$$

wherein:
  J denotes a cost of the monitoring rule;
  $C_{TP}$ denotes a cost associated with the true positive outcomes;
  $R_{TP}$ denotes a rate associated with the true positive outcomes;
  $C_{TN}$ denotes a cost associated with the true negative outcomes;

$R_{TN}$ denotes a rate associated with the true negative outcomes;

$C_{FP}$ denotes a cost associated with the false positive outcomes;

$R_{FP}$ denotes a rate associated with the false positive outcomes;

$C_{FN}$ denotes a cost associated with the false negative outcomes; and $R_{FN}$ denotes a rate associated with the false negative outcomes.

14. The apparatus of claim 10, wherein, to update or replace the monitoring rule, the at least one processing device is configured to:
   obtain one or more tuning parameter values for the monitoring rule; and
   identify a statistical performance and an economic performance of the monitoring rule with the one or more tuning parameter values and identify an economic benefit of using the monitoring rule with the one or more tuning parameter values.

15. The apparatus of claim 14, wherein, to update or replace the monitoring rule, the at least one processing device is further configured to:
   repeatedly obtain the one or more tuning parameter values for the monitoring rule during multiple iterations;
   for each iteration, identify the statistical performance and the economic performance of the monitoring rule with the one or more tuning parameter values for that iteration and identify the economic benefit of using the monitoring rule with the one or more tuning parameter values for that iteration; and
   update or replace the monitoring rule using the one or more tuning parameter values associated with a selected one of the iterations.

16. A non-transitory computer readable medium containing computer readable program code for monitoring assets in an industrial process control and automation system that, when executed by at least one processing device, causes the at least one processing device to:
   obtain from an asset monitoring system, historical operational data associated with at least one asset and obtaining historical failure data associated with faults of the at least one asset;
   generate alerts or notifications by executing at least one monitoring rule using the obtained historical operational data;
   identify known faults by comparing the generated alerts or notifications with the faults of the at least one asset;
   identify a statistical performance of the at least one monitoring rule associated with an asset monitoring system, the statistical performance comprising an effectiveness of the monitoring rule in identifying the known faults by identifying rates associated with different outcomes of the monitoring rule, the different outcomes including true positive outcomes, true negative outcomes, false positive outcomes, and false negative outcomes;
   identify an economic performance of the monitoring rule, by generating at least one economic cost function associated with the at least one monitoring rule, wherein the processing device executes a calibration analytics querying of a user or a database to obtain values for the costs associated with the true positive, true negative, false positive, and false negative outcomes of the monitoring rule;
   identify one or more tuning parameter values of the monitoring rule based on the at least one economic cost function; and
   update or replace the monitoring rule based on the economic performance to optimize asset monitoring by varying at least one parameter value of the monitoring rule to identify which parameter value provides improved or optimized cost.

17. The non-transitory computer readable medium of claim 16, wherein:
   the computer readable program code that when executed causes the at least one processing device to identify the economic performance of the monitoring rule comprises:
      computer readable program code that when executed causes the at least one processing device to generate a cost function based on the rates associated with the different outcomes of the monitoring rule and the costs associated with the different outcomes of the monitoring rule.

18. The non-transitory computer readable medium of claim 16, wherein the computer readable program code that when executed causes the at least one processing device to update or replace the monitoring rule comprises computer readable program code that when executed causes the at least one processing device to:
   repeatedly obtain one or more tuning parameter values for the monitoring rule during multiple iterations;
   for each iteration, identify a statistical performance and an economic performance of the monitoring rule with the one or more tuning parameter values for that iteration and identify an economic benefit of using the monitoring rule with the one or more tuning parameter values for that iteration; and
   update or replace the monitoring rule using the one or more tuning parameter values associated with a selected one of the iterations.

* * * * *